United States Patent [19]

Hamisch, Jr.

[11] 4,280,862

[45] Jul. 28, 1981

[54] LABEL PRINTING AND APPLYING APPARATUS

[75] Inventor: Paul H. Hamisch, Jr., Franklin, Ohio

[73] Assignee: Monarch Marking Systems, Inc., Dayton, Ohio

[21] Appl. No.: 68,843

[22] Filed: Aug. 22, 1979

[51] Int. Cl.[3] .......................... B32B 31/00; B41F 1/02; B41F 1/08

[52] U.S. Cl. .......................... 156/384; 101/292; 156/541; 156/579; 156/584; 267/136

[58] Field of Search .......................... 156/384, 541, 579, 584, 156/387; 101/93.03, 288, 292, 291; 267/136, 137

[56] References Cited

U.S. PATENT DOCUMENTS

| | | | |
|---|---|---|---|
| 3,276,760 | 10/1966 | Last et al. | 267/136 |
| 3,408,931 | 11/1968 | Austin | 101/318 |
| 3,490,365 | 1/1970 | Roche | 101/292 |
| 3,656,430 | 4/1972 | Olsson | 101/288 |
| 3,659,835 | 5/1972 | Peterson | 267/136 |
| 3,902,952 | 9/1975 | Penaluna | 156/384 |
| 4,059,476 | 11/1977 | Hamisch | 156/384 |
| 4,072,105 | 2/1978 | Becker et al. | 101/288 |
| 4,113,544 | 9/1978 | Sato | 156/384 |
| 4,116,746 | 9/1978 | Hamisch | 156/384 |
| 4,116,747 | 9/1978 | Hamisch | 156/384 |
| 4,125,419 | 11/1978 | Hamisch | 156/384 |
| 4,125,421 | 11/1978 | Hamisch | 156/584 |
| 4,126,302 | 11/1978 | Curnutt | 267/136 |
| 4,144,810 | 3/1979 | Sato | 156/384 |

*Primary Examiner*—Jerome W. Massie
*Attorney, Agent, or Firm*—Joseph J. Grass

[57] ABSTRACT

There is disclosed a hand-held label printing and applying apparatus having an impression control mechanism. The apparatus includes a pair of relatively movable slides. A first slide is driven in response to movement of a manually operable actuator and a second slide which carries the print head is slidably mounted on the first slide. During the initial actuation of the actuator, the first and second slides move as a unit until the second slide is stopped by a shoulder of a latch. Continued movement of the actuator and travel of the first slide causes energy to be stored in a spring arrangement. Upon further movement of the actuator and continued travel of the first slide the latch is tripped and the spring arrangement drives the second slide and causes the print head to be driven into a straight line into printing cooperation with the platen. There is also enclosed an arrangement by which the print head can be releasably connected to the second slide. The apparatus also includes an improved spring assembly.

16 Claims, 15 Drawing Figures

LABEL PRINTING AND APPLYING APPARATUS

BACKGROUND OF THE INVENTION

1. Field of the Invention

This invention relates to art of label printing and applying apparatus.

2. Brief Description of the Prior Art

U.S. Pat. No. 4,116,747 to Hamisch, Jr. issued Sept. 26, 1978 relates to label printing and applying apparatus in general and the following U.S. patents relate to label printing and applying apparatus having impression control devices: U.S. Pat. No. 3,408,931 to Austin issued Nov. 5, 1968, U.S. Pat. No. 3,490,365 to Roche issued Jan. 20, 1970, U.S. Pat. No. 3,656,430 to Olsson issued Apr. 18, 1972, U.S. Pat. No. 4,072,105 to Becker issued Feb. 7, 1978, U.S. Pat. No. 4,113,544 to Yo Sato Issued Sept. 12, 1978, and U.S. Pat. No. 4,125,421 to Hamisch, Jr. issued Nov. 14, 1978.

SUMMARY OF THE INVENTION

This invention relates to an improved spring assembly which, once assembled, is safe to handle even though the assembly is spring loaded. The spring itself is used to maintain the integrity of the spring assembly. This spring assembly is compact because it can be made of small diameter or transverse dimensions making it especially useful in a hand-held device. The spring assembly is economical to construct being made of relatively few, preferably molded plastics parts and a spring. At least one and preferably two of such spring assemblies are useful in connection with an improved impression control mechanism for a hand-held label printing and applying apparatus a specific embodiment of which is disclosed in the present application.

DETAILED DESCRIPTION OF THE PREFERRED EMBODIMENT

Figure 1:
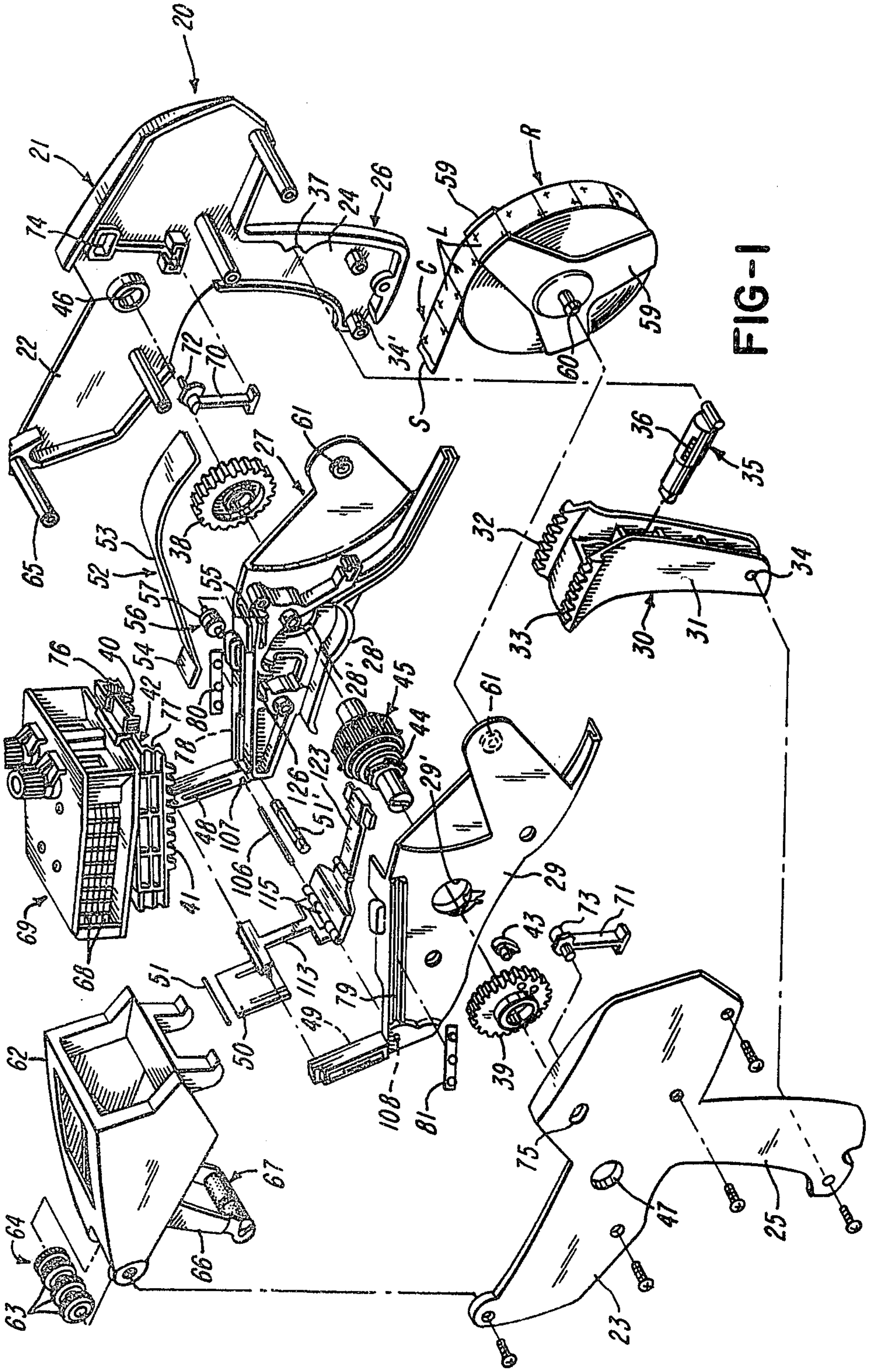
FIG. 1 is an exploded perspective view of a hand-held label printing and applying apparatus in accordance with the invention.
Figure 3:
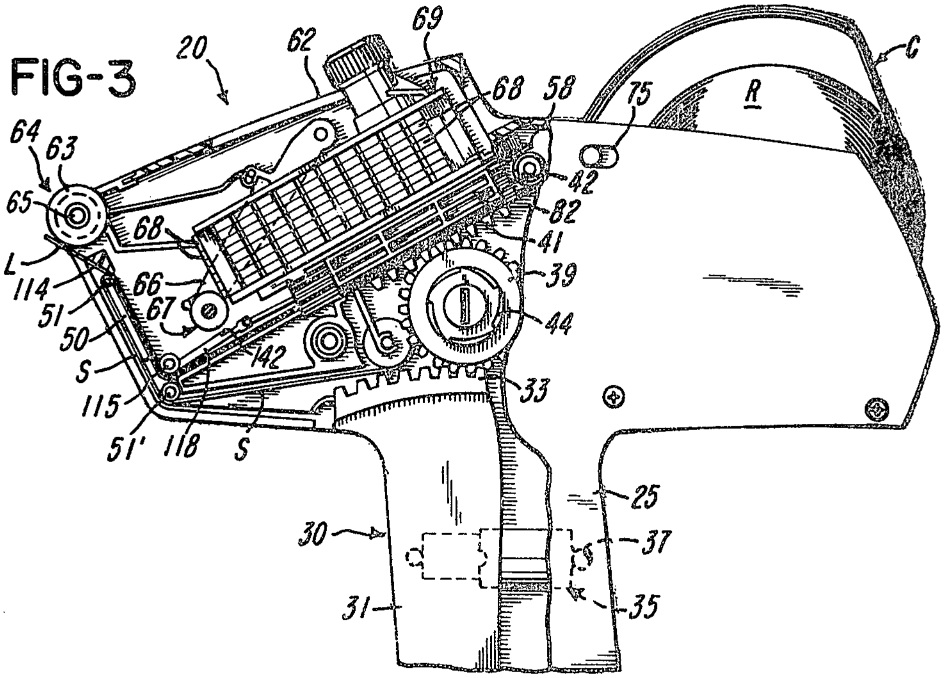
FIG. 3 is a fragmentary side elevational view partly in section of the apparatus.

Referring to FIG. 1, there is shown a hand-held label printing and applying apparatus generally indicated at 20 including a housing generally indicated at 21 having housing sections 22 and 23. The housing sections 22 and 23 have respective handle portions 24 and 25 which constitute a handle generally indicated at 26. Disposed within the housing 21 is a subframe generally indicated at 27 which includes a subframe section 28 and a generally mirror-image subframe section 29 connected thereto. An actuator generally indicated at 30 comprises a lever 31 having a pair of gear sections or segments 32 and 33. The gear sections 32 and 33 are disposed at the opposite end of the lever from pivot hole 34 in which post 34' is received. A spring assembly generally indicated at 35 includes a compression spring 36. The spring assembly 35 exerts a counterclockwise biasing force against the actuator 30 and bears against a concave recess 37 of the handle 26. The gear sections 32 and 33 mesh with respective gears 38 and 39. The gears 38 and 39 also mesh with respective racks or gear sections 40 and 41 on a slide generally indicated at 42. The gear 39 pivotally mounts a pawl 43 cooperable with a ratchet wheel 44. The ratchet wheel 44 drives a tooth feed wheel generally indicated at 45. The gears 38 and 39, the ratchet wheel 44 and the feed wheel 45 are shown to be coaxial with each other and with holes 46 and 47 in the respective housing sections 22 and 23 and holes 28' and 29' in respective subframe sections 28 and 29. The subframe sections 28 and 29 have opposed recesses 48 and 49 for receiving side edges of a printing platen 50. A delaminator 51 in the form of a peel roller is received at its end portions in the recesses 48 and 49 forward of the platen 50 as best shown in FIG. 3. A resilient device generally indicated at 52 includes a leaf spring or spring finger 53 and a mounting portion 54 received in opposed recesses 55 in the respective subframe sections 28 and 29. A brake generally indicated at 56 includes a brake roll 57 and an extension 58 (FIGS. 3 and 4) on the slide 42 cooperable with the brake roll 57 for applying a braking force to composite web C when the slide 42 is at or near the home position. Hub members 59 have shaft portions 60 (only one of which is shown) received in mounting bores 61 in subframe sections 28 and 29. The hub members 59 rotatably mount a roll R of the composite web C. The composite web C is comprised of a plurality of labels L secured by pressure sensitive adhesive to a web of supporting material S.

The housing 21 also includes a movable housing section 62. The housing section 62 and rollers 63 of an applicator 64 are rotatably mounted on a post 65 (FIG. 3) secured to the housing section 22. The housing section 62 pivotally mounts a carrier 66 which in turn mounts an ink roller generally indicated at 67. The ink roller 67 inks the printing bands 68 of a print head 69 when the actuator 30 is manually operated as is more clearly evident from FIG. 3. The housing section 62 is releasably locked in position by a pair of flexible resilient locking devices indicated at 70 and 71 having manually engageable projections 72 and 73 extending through respective holes 74 and 75. The slide 42 has a pair of opposed ball tracks 76 and 77 adjacent respective ball tracks 78 and 79. A ball bearing 80 is disposed between ball tracks 76 and 78 and a ball bearing 81 is disposed between ball tracks 77 and 79 for slidably mounting the slide 42.

Figure 4:
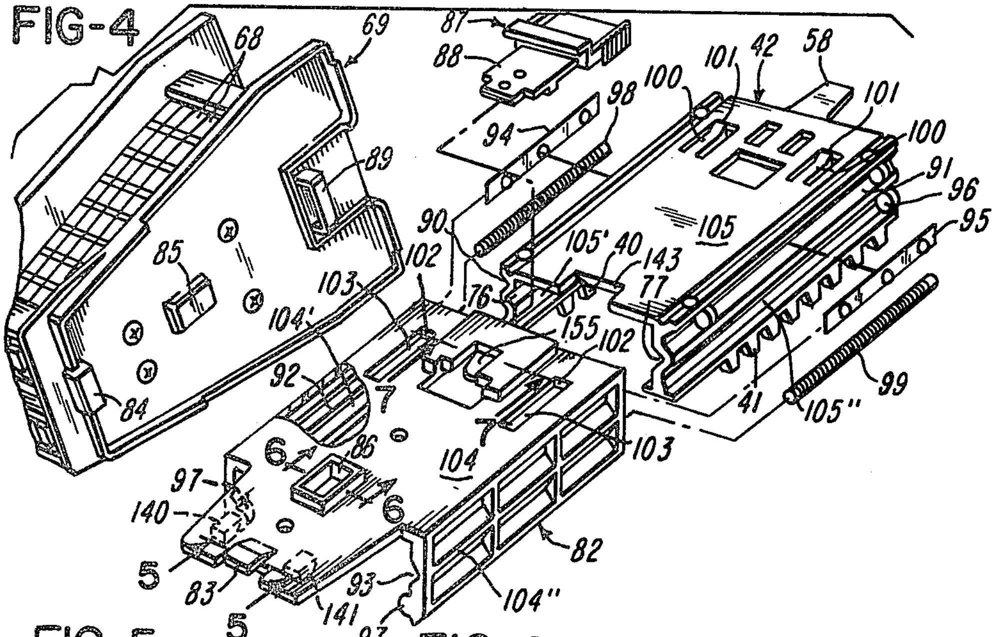
FIG. 4 is an exploded perspective view of the print head and an associated pair of slides.
Figure 5:
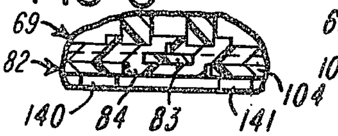
FIG. 5 is a sectional view showing fragmentary portions of the print head and one of the slides taken generally along line 5—5 of FIG. 4.
Figure 6:
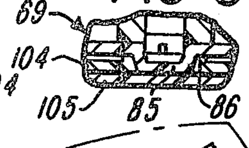
FIG. 6 is a sectional view taken along line 6—6 of FIG. 4.
Figure 7:
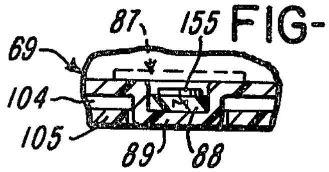
FIG. 7 is a sectional view taken along line 7—7 of FIG. 4.

With reference to FIG. 4 there is also shown a second slide generally indicated at 82. The slide 82 and the print head 69 can be readily securely releasably locked to each other by means of a projection 83 extending into a tubular portion or socket 84, a post 85 extending into a recess or socket 86 and a releasable lock 87 having a projecting tongue 88 extending into a U-shaped member 89. The slide 42 also has external ball tracks 90 and 91 and the slide 82 has opposed ball tracks 92 and 93. Ball bearing 94 is disposed between ball tracks 90 and 92 and ball bearing 95 is disposed between ball tracks 91 and 93. So, therefore, the slide 82 is slidably mounted on the slide 42 and friction is kept to a minimum without sacrificing straight line guiding by employing ball bearings 94 and 95. The slide 42 has a pair of stops 96, only one of which is shown and the slide 82 has a pair of stops 97. The slides 42 and 82 are resiliently urged by spring assemblies 98 and 99. The spring assemblies 98 and 99 are identical to each other. The respective spring assemblies 98 and 99 abut stops 96 and 97. The slides 42 and 82 are urged in opposite directions by the spring assemblies 98 and 99. In order to keep the slides 42 and 82 in assembled relationship there are provided resilient spring fingers 100 having abutment faces 101. The abutment faces 101 are engageable with shoulders 102 provided by slots 103 in planar portion 104 of the slide 82. The slide 42 has a planar portion 105 which underlies the planar portion 104. Planar portions 104 and 105 are in face-to-face relationship. The slides 42 and 82 are generally U-shaped transversely. Racks 40 and 41 are disposed on legs 105′ and 105″. Legs 104′ and 104″ depend from planar portion 104 and straddle legs 105′ and 105″. During assembly, the spring fingers 100 readily deflect downwardly from the position shown in FIG. 4, but when they resiliently spring back, the spring fingers 100 will engage the abutment faces 102, thereby holding the slides 42 and 82 connected to each other.

Figure 2:
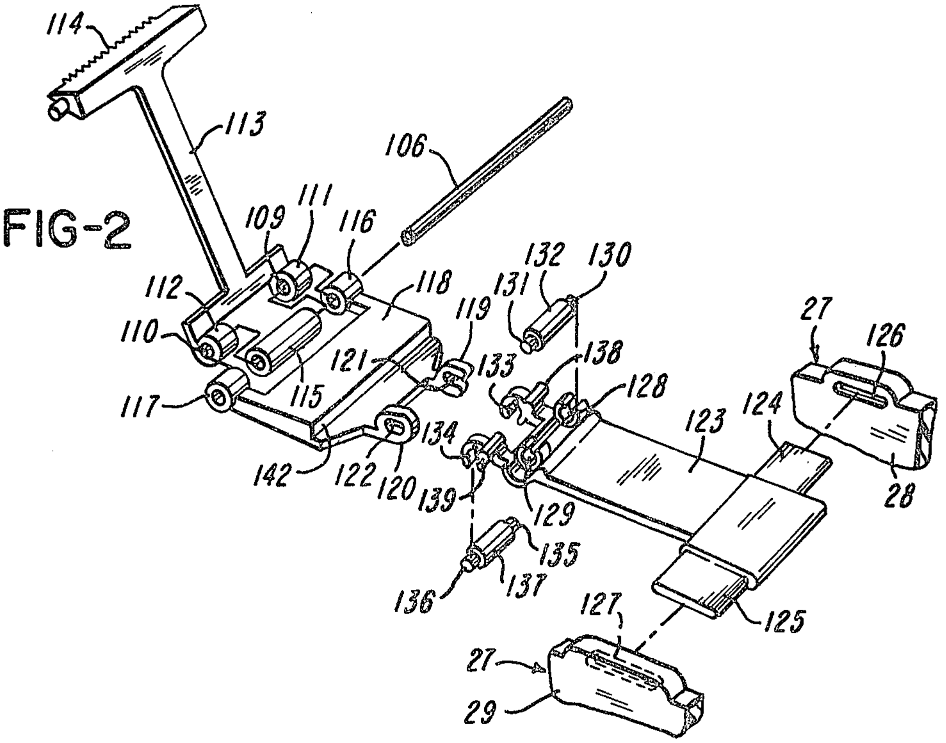
FIG. 2 is an exploded perspective view of a latch shown diagrammatically in FIG. 1.

Referring now to FIGS. 1 and 2, FIG. 2 showing greater detail, there is shown a pin 106 received in bores 107 and 108 in subframe sections 28 and 29. The pin 106 extends through aligned bores 109 and 110 in mounting members 111 and 112. The members 111 and 112 are connected to hold-down member 113 which holds down and guides the composite web. The hold-down member 113 is connected to a guide 114 which guides the label L into underlying relationship with respect to the applicator 64. The pin 106 also extends through a roller 115 disposed between the members 111 and 112. The pin 106 also extends through mounting members 116 and 117 of a link 118. The link 118 has a fork 119 and closed slotted member 120 having aligned openings 121 and 122. A leaf spring 123 is cantilever mounted by projections 124 and 125 which extend into recesses 126 and 127 in the subframe sections 28 and 29. Aligned C-shaped openings 128 and 129 receive end portions 130 and 131 of a roll 132. Aligned C-shaped portions 133 and 134 receive end portions 135 and 136 of a roll 137. The roll 137 guides the top side of the composite web C. In that the leaf spring 123 is molded integrally with the sockets 128, 129, 133 and 134, the respective rollers 132 and 137 are resiliently snap-fitted into respective sockets 128 and 129 and 133 and 134. An outwardly extending projection or pin 138 is received in the forked opening 121 and an outwardly extending projection or pin 139 is received in the slotted opening 122.

Figure 10:
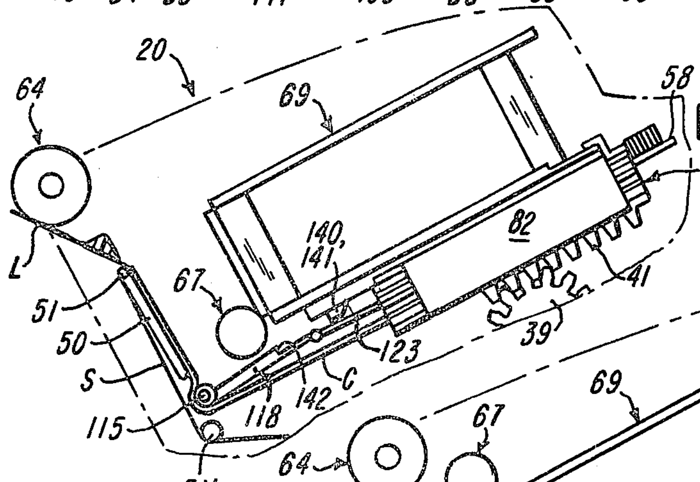
FIG. 10 is a diagrammatic side elevational view showing the operative components in their initial or home position.
Figure 11:
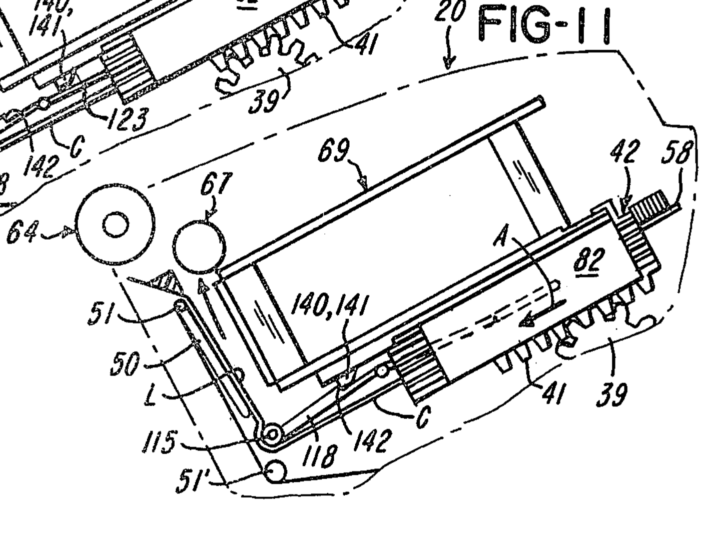
FIG. 11 is a view similar to FIG. 10 but showing the print head as having advanced to a position where a latch tooth on the print head is in contact with a stop tooth on the print head latch.
Figure 12:
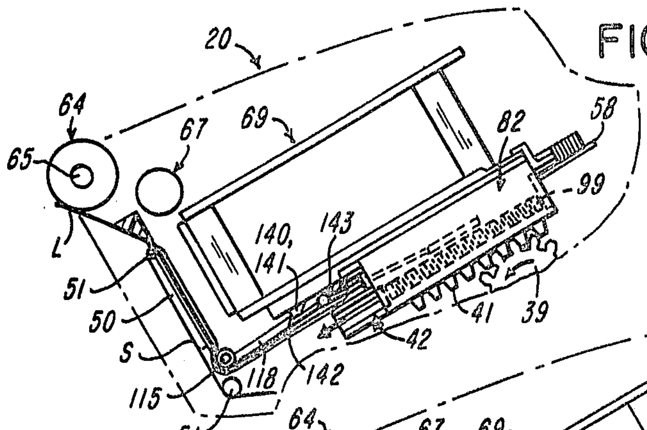
FIG. 12 is a view similar to FIG. 11 but showing a first slide as having moved further in the direction of the arrow, with the second slide and the print head being held stationary.
Figure 13:
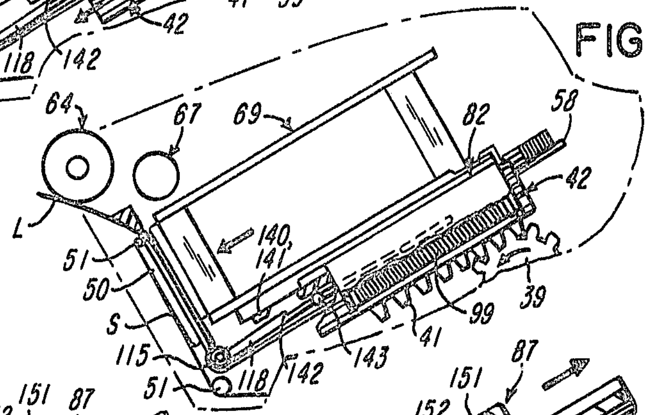
FIG. 13 is a view similar to FIG. 12 but showing the print head lock as having been released to enable the print head to be driven into printing cooperation with the platen.
Figure 8:
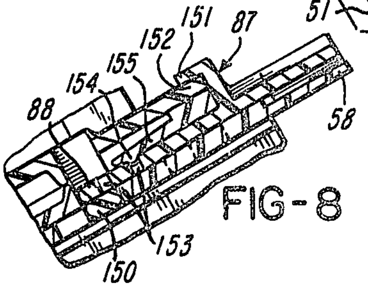
FIG. 8 is a sectional view of a lock for releasably locking the print head to one of the slides, shown in the locked condition.

Referring now to FIGS. 4, 10 and 11, the underside of the planar portion 104 of the slide 82 has a pair of teeth 140 and 141 which move in a straight line. An abutment face 142 on the link 118 is in the path of movement of the teeth 140 and 141. As is evident from FIG. 10, the composite web C passes around the roller 115 and a label L is dispensed as the supporting material web S passes about the delaminator 51. Thereafter, the supporting material web S passes around a roller 142 and into engagement with the toothed feed wheel 45. When the actuator 30 is operated, the gear sections 32 and 33 drive the gears 38 and 39 to advance the slide 42 in the direction of arrow A shown in FIG. 11. The spring assemblies 98 and 99 and abutment faces 101 action on shoulders 102 hold the slides 42 and 82 together for movement as a unit until the teeth 140 and 141 abut the shoulder 142 as shown in FIG. 11. Accordingly, movement of the slide 82 and the print head 69 are arrested. However, the slide 42 can continue to move in the direction of arrow A upon continued actuation of the actuator 30. When inclined face 143 of the slide 42 contacts the roller 132, the leaf spring 123 is caused to deflect in a counterclockwise direction as viewed in FIG. 12, for example, and the link 118 is pivoted clockwise to move the abutment face 142 out of the path of the teeth 140 and 141, thereupon the spring assemblies 98 and 99 drive the print head 69 into printing cooperation with the platen 50 to print the desired indicia on a label L. When the actuator 30 is released, the spring assembly 35 returns the actuator 30, the gears 38 and 39, the slides 42 and 82, and the print head 69 to their initial or home positions. The printing force exerted by the print head 69 on the label L and the underlying platen 50 is essentially independent of the force exerted by the user on the actuator 30. Yet the components of the apparatus 20 are relatively simple to construct, lightweight, easy to assemble, and reliable in their operation.

Figure 9:
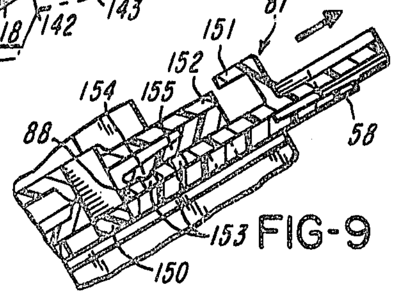
FIG. 9 is a view similar to FIG. 8, but showing the lock in the unlocked position.

The print head 69 can be releasably locked in position by the lock 87. The tongue 88 fits over a bight 150 of the U-shaped member 89 and in addition the lock 87 has a shoulder or flange 151 which overlies the rear portion 152 of the print head 69. The lock has a pair of holes 153 into which a projection 154 on a spring finger 155 can alternately extend. The spring finger 155 is formed integrally with the planar portion 104 of the slide 82. By moving the lock 87 to the position shown in FIG. 9, the tongue 88 is out of cooperation with the bight 150 and the flange 151 is out of cooperation with the portion 152. Accordingly the print head 69 can be pivoted upwardly so that the projection 85 moves out of the recess 86 and the print head 69 can be moved forward slightly to release the tongue 88 from its nesting relation in the tubular portion 84.

Figure 14:
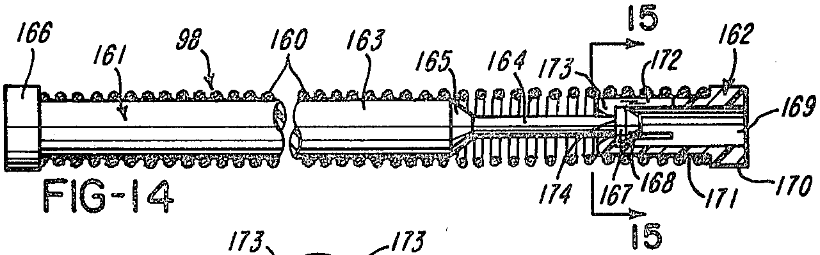
FIG. 14 is an enlarged sectional view of one of the spring assemblies shown in FIG. 4.
Figure 15:
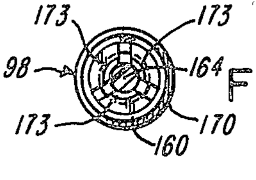
FIG. 15 is a sectional view taken along line 15—15 of FIG. 14.

With reference to FIGS. 14 and 15, the low cost, easy-to-assemble spring assembly 98 is shown in detail. This spring assembly 98 is identical to the spring assembly 99. The spring assembly 98 is shown to include a compression spring 160 and a pair of members 161 and 162. According to the preferred embodiment the members 161 and 162 telescope relative to each other. The member 161 has a relatively large transverse diameter section 163 joined to a relatively small transverse dimension section 164 by a conical section 165. The section 163 has an enlarged head 166 against which one end portion of the spring 160 abuts. One end portion of the section 164 has a head 167 with a conical end portion 168. The member 162 has a bore 169 and has an enlarged head 170 against which the other end portion of the spring 160 abuts. Outer surface 171 of the member 162 has the same outside dimension as the section 163. The section 162 has a plurality and specifically three flexible resilient spring fingers 172 terminating at hook-shaped ends 173. In assembling the members 162 and 163, the head 167 and the sections 164, 165 and 163 are inserted into the spring 160 until the spring 160 abuts the head 166. The spring 160 is compressed until the right hand end of the spring 160 as viewed in FIG. 14 is at a position to the left of the head 167. The section 162 is thereupon telescoped over the head 167 and in so doing the spring fingers 172 spread outwardly until the hook-shaped ends 173 bear against shoulder 174 of the head 167. Thereupon the spring 160 is released and it extends to the position shown in FIG. 14. The coils of the spring themselves prevent the spring fingers 172 from moving outwardly. Accordingly, the spring device 98 with the compressed helical spring 160 cannot release the spring 160 from compression because the members 162 and 163 cannot separate.

Other embodiments and modifications of this invention will suggest themselves to those skilled in the art, and all such of these as come within the spirit of this invention are included within its scope as best defined by the appended claims.

I claim:

1. Apparatus for printing and applying pressure sensitive labels releasably adhered to a web of supporting material, the apparatus comprising: a housing having a handle, a platen and a cooperable print head mounted by the housing, the housing having means for rotatably supporting a roll of pressure sensitive labels, means for delaminating printed labels from the web, means for applying printed labels, means defining a path for the web from the label roll, to between the platen and the print head, around the delaminating means, into engagement with the feeding means and out of the housing, and means for moving the print head into and out of printing cooperation with the platen and for thereafter moving the feeding means to advance the web to dispense a label into label applying relationship with the label applying means and to bring another label to a printing position between the print head and the platen, the moving means including a first slide slidably mounted by the housing, a second slide connected to the print head and slidably mounted on and relative to the first slide, a manually engageable actuator disposed at the handle, releasable latch means for the second slide, wherein the first and second slides move as a unit when the actuator is manually actuated until the movement of the second slide is stopped by the latch means, spring means acting on the first and second slides, the actuating means further including means coupling the actuator and the first slide for moving the first slide to compress the spring means while travel of the second slide is prevented by the latch means to effect accumulation of energy in the spring means, and means effective after a predetermined length of travel of the first slide for releasing the latch means to enable the spring means to drive the second slide and move the print head into printing cooperation with the platen, the spring means including a modular spring assembly having a captive spring which is at least partially loaded at all times.

2. In an apparatus for printing and applying pressure sensitive labels releasably adhered to a web of supporting material, and having a housing having a handle, a platen and a cooperable print head mounted by the housing, the housing having means for rotatably supporting a roll of pressure sensitive labels, means for delaminating printed labels from the web, means for applying printed labels, means defining a path for the web from the label roll, to between the platen and the print head, around the delaminating means, into engagement with the feeding means and out of the housing, and means for moving the print head into and out of printing cooperation with the platen and for thereafter moving the feeding means to advance the web to dispense a label into label applying relationship with the label applying means and to bring another label to a printing position between the print head and the platen, the moving means including a first slide slidably mounted by the housing, a second slide connected to the print head and slidably mounted on and relative to the first slide, a manually engageable actuator disposed at the handle, and spring means acting on the first and second slides, releasable latch means for the second slide, the moving means further including means coupling the actuator and the first slide for moving the first slide relative to the second slide to compress the spring means to accumulate energy in the spring means, and means for releasing the latch means to enable the spring means to drive the second slide relative to the first slide and move the print head into printing cooperation with the platen, the spring means including a modular spring assembly having a captive spring which is at least partially loaded at all times.

3. Apparatus for printing and applying pressure sensitive labels releasably adhered to a web of supporting material, the apparatus comprising: a housing having a handle, a platen and a cooperable print head mounted by the housing, the housing having means for rotatably supporting a roll of pressure sensitive labels, means for delaminating printed labels from the web, means for applying printed labels, means defining a path for the web from the label roll, to between the platen and the print head, around the delaminating means, into engagement with the feeding means and out of the housing, and means for moving the print head into and out of printing cooperation with the platen and for thereafter moving the feeding means to advance the web to dispense a label into label applying relationship with the label applying means and to bring another label to a printing position between the print head and the platen, the moving means including a first slide slidably mounted by the housing, a second slide connected to the print head and slidably mounted on and relative to the first slide, a manually engageable actuator disposed at the handle, releasable latch means for the second slide, wherein the first and second slides move as a unit when the actuator is manually actuated until the movement of the second slide is stopped by the latch means, spring means acting on the first and second slides, the actuating means further including means coupling the actuator and the first slide for moving the first slide to compress the spring means while travel of the second slide is prevented by the latch means to effect accumulation of energy in the spring means, and means effective after a predetermined length of travel of the first slide for releasing the latch means to enable the spring means to drive the second slide and move the print head into printing cooperation with the platen, the spring means including a spring assembly having a plurality of coupled telescoping members, one member having a head and another member having a socket for receiving the head, the socket having a plurality of fingers for gripping the head, and a helical spring for exerting opposite forces on the members and for maintaining the members in coupled relationship.

4. In an apparatus for printing and applying pressure sensitive labels releasably adhered to a web of supporting material and including a housing having a handle, a platen and a cooperable print head mounted by the housing, the housing having means for rotatably supporting a roll of pressure sensitive labels, means for delaminating printed labels from the web, means for applying printed labels, means defining a path for the web from the label roll, to between the platen and the print head, around the delaminating means, into engagement with the feeding means and out of the housing, and means for moving the print head into and out of printing cooperation with the platen and thereafter moving the feeding means to advance the web to dispense a label into label applying relationship with the label applying means and to bring another label to a printing position between the print head and the platen, the improvement in the moving means residing in a spring assembly having a plurality of coupled telescoping members, one member having a head and another member having a socket for receiving the head, the socket having a plurality of spreadable fingers for gripping the head, and a helical spring for exerting opposite forces on the members and for limiting the spreading of the fingers to maintain the members in coupled relationship.

5. A spring assembly, comprising: a plurality of coupled telescoping members, one member having a head and another member having a socket for receiving the head, the socket having a plurality of spreadable fingers for gripping the head, and a helical spring for exerting opposite forces on the members and for limiting the spreading of the fingers to maintain the members in coupled relationship.

6. Apparatus for printing and applying pressure sensitive labels releasably adhered to a web of supporting material, the apparatus comprising: a housing having a handle, a platen and a cooperable print head mounted by the housing, the housing having means for rotatably supporting a roll of pressure sensitive labels, means for delaminating printed labels from the web, means for applying printed labels, means defining a path for the web from the label roll, to between the platen and the print head, around the delaminating means, into engagement with the feeding means and out of the housing, and means for moving the print head into and out of printing cooperation with the platen and for thereafter moving the feeding means to advance the web to dispense a label into label applying relationship with the label applying means and to bring another label to a printing position between the print head and the platen, the moving means including a first slide slidably mounted by the housing, a second slide connected to the print head and slidably mounted on and relative to the first slide, a manually engageable actuator disposed at the handle, releasable latch means for the second slide, wherein the first and second slides move as a unit when the actuator is manually actuated until the movement of the second slide is stopped by the latch means, spring means acting on the first and second slides, the actuating means further including means coupling the actuator and the first slide for moving the first slide to compress the spring means while travel of the second slide is prevented by the latch means to effect accumulation of energy in the spring means, and means effective after a predetermined length of travel of the first slide for releasing the latch means to enable the spring means to drive the second slide and move the print head into printing cooperation with the platen, the spring means including a spring assembly having a plurality of coupled telescoping members, one member having a head and another member having a socket for receiving the head, the socket having a plurality of fingers for gripping the head, and a helical spring for exerting opposite forces on the members and for maintaining the members in coupled relationship, wherein the one member includes a first section having a relatively large transverse dimension and a second section having a relatively small transverse dimension joined to the first section, the second section terminating at the head, the fingers of the other member being received about the second section and being engaged with the head.

7. In an apparatus for printing and applying pressure sensitive labels releasably adhered to a web of supporting material and including a housing having a handle, a platen and a cooperable print head mounted by the housing, the housing having means for rotatably supporting a roll of pressure sensitive labels, means for delaminating printed labels from the web, means for applying printed labels, means defining a path for the web from the label roll, to between the platen and the print head, around the delaminating means, into engagement with the feeding means and out of the housing, and means for moving the print head into and out of printing cooperation with the platen and thereafter moving the feeding means to advance the web to dispense a label into label applying relationship with the label applying means and to bring another label to a printing position between the print head and the platen, the improvement in the moving means residing in a spring assembly having a plurality of coupled telescoping members, one member having a head and another member having a socket for receiving the head, the socket having a plurality of spreadable fingers for gripping the head, and a helical spring for exerting opposite forces on the members and for limiting the spreading of the fingers to maintain the members in coupled relationship, wherein the one member includes a first section having a relatively large transverse dimension and a second section having a relatively small transverse dimension joined to the first section, the second section terminating at the head, the fingers of the other member being received about the second section and being engaged with the head.

8. A spring assembly, comprising: a plurality of coupled telescoping members, one member having a head and another member having a socket for receiving the head, the socket having a plurality of spreadable fingers for gripping the head, and a helical spring for exerting opposite forces on the members and for limiting the spreading of the fingers to maintain the members in coupled relationship, wherein the one member includes a first section having a relatively large transverse dimension and a second section having a relatively small transverse dimension joined to the first section, the second section terminating at the head, the fingers of the other member being received about the second section and being engaged with the head.

9. In an apparatus as defined in any one of claims 1 through 5, wherein the spring is a compression spring.

10. In an apparatus as defined in any one of claims 3, 4, 5, 6, 7 or 8, wherein the first and second members are composed of molded plastics material.

11. In an apparatus as defined in any one of claims 3, 4, 5, 6, 7 or 8, wherein the spring is a compression spring and the members have opposed shoulders against which the end portions of the spring act.

12. In an apparatus as defined in any one of claims 6, 7 or 8, wherein the inside dimension of the spring is only slightly larger than the outside dimension of the first section.

13. In an apparatus as defined in any one of claims 6, 7 or 8, wherein the outside dimension of the other member is substantially equal to the outside dimension of the first section.

14. In an apparatus as defined in any one of claims 3, 4, 5, 6, 7 and 8, wherein the fingers are flexible and resilient.

15. In an apparatus as defined in any one of claims 3, 4 or 5, wherein the helical spring is received about the members.

16. In an apparatus as defined in claim 4, wherein the helical spring surrounds the fingers.

* * * * *